United States Patent
Raikov et al.

(10) Patent No.: US 10,990,429 B2
(45) Date of Patent: Apr. 27, 2021

(54) RULE-BASED REALLOCATION OF HOSTED COMPUTE RESOURCES

(71) Applicant: VMware, Inc., Palo Alto, CA (US)

(72) Inventors: Ventsyslav Raikov, Sofia (BG); Boris Savov, Sofia (BG); Rosen Spasov, Sofia (BG); Petar Mitrov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 88 days.

(21) Appl. No.: 15/918,230

(22) Filed: Mar. 12, 2018

(65) Prior Publication Data

US 2019/0278625 A1    Sep. 12, 2019

(51) Int. Cl.
G06F 9/455    (2018.01)
G06F 9/46    (2006.01)
G06F 9/50    (2006.01)

(52) U.S. Cl.
CPC ........ G06F 9/45558 (2013.01); G06F 9/5077 (2013.01); *G06F 2009/4557* (2013.01)

(58) Field of Classification Search
CPC .... G06F 9/5077; G06F 9/5061; G06F 9/5005; G06F 9/5011; G06F 9/5027; G06F 9/5044; G06F 9/505; G06F 9/5083; G06F 9/5066; G06F 9/45558; G06F 2009/4557; H04L 67/1008; H04L 67/101; H04L 67/1012; H04L 67/1014; H04L 67/1023; H04L 67/1025; H04L 67/1029; H04L 67/1031; H04L 41/5054; H04L 41/0816; H04L 41/0813; H04L 41/5051; H04L 41/5045
See application file for complete search history.

(56) References Cited

U.S. PATENT DOCUMENTS

| | | | |
|---|---|---|---|
| 7,739,687 B2 * | 6/2010 | Newport | H04L 67/10 709/223 |
| 8,516,490 B2 | 8/2013 | Branson et al. | |
| 8,738,412 B2 | 5/2014 | Flockhart et al. | |
| 10,277,628 B1 * | 4/2019 | Jakobsson | H04L 51/12 |
| 2004/0243699 A1 * | 12/2004 | Koclanes | H04L 29/06 709/224 |
| 2005/0228707 A1 | 10/2005 | Hendrickson | |
| 2009/0089236 A1 * | 4/2009 | Lamprecht | G10L 15/26 706/46 |
| 2009/0106320 A1 * | 4/2009 | Dageville | G06F 16/24542 |
| 2010/0198972 A1 | 8/2010 | Umbehocker | |
| 2012/0084863 A1 * | 4/2012 | Garcia Morchon | H04W 12/12 726/23 |

(Continued)

*Primary Examiner* — Emerson C Puente
*Assistant Examiner* — Zhi Chen (57) ABSTRACT

Herein, rule-based handling of request for resource re-allocations provides for automated re-allocations, reducing the need for administrator intervention. The resources available to a reservation can be increased, decreased, or otherwise modified by forming and breaking selected connections between reservations and hosts. The rules herein determine which connections are to be formed or broken. Each rule associates a connection-modification criterion with a condition. In the event, the condition for a rule is satisfied by a reallocation request (and its context), the criterion is applied to the request plus its context to generate a list of connection modification plans. Each connection-modification plan identifies one or more connections between hosts and reservations to be formed or broken. Implementing the plan yields the desired re-allocation.

12 Claims, 7 Drawing Sheets

(56) References Cited

U.S. PATENT DOCUMENTS

| | | | |
|---|---|---|---|
| 2012/0096165 A1 | 4/2012 | Madduri et al. | |
| 2012/0151476 A1* | 6/2012 | Vincent | G06F 9/45558 718/1 |
| 2013/0212576 A1 | 8/2013 | Huang et al. | |
| 2013/0311667 A1* | 11/2013 | Payette | H04L 67/14 709/228 |
| 2014/0317043 A1* | 10/2014 | Lindsay | G06N 5/04 706/52 |
| 2015/0350062 A1* | 12/2015 | Lindem, III | H04L 45/18 370/220 |
| 2016/0057077 A1* | 2/2016 | Gomatam | H04L 41/5051 709/226 |
| 2017/0286176 A1* | 10/2017 | Artman | G06F 9/5027 |
| 2018/0139230 A1* | 5/2018 | Newton | H04L 61/106 |
| 2018/0175620 A1* | 6/2018 | Fukuda | H02J 13/0017 |

* cited by examiner

RULE-BASED REALLOCATION OF HOSTED COMPUTE RESOURCES

BACKGROUND

In cloud automation systems, when a user group needs additional resources, a cloud administrator and, possibly, a virtual-infrastructure administrator may need to act to fulfill the request. This is particularly the case where user groups are competing for limited compute resources. The need for administrator intervention ties up human resources and delays the delivery of compute resources, resulting in losses in efficiency in both respects.

DETAILED DESCRIPTION

Herein, rule-based handling of request for resource re-allocations provides for automated re-allocations, reducing the need for administrator intervention. The resources available to a reservation can be increased, decreased, or otherwise modified by forming and breaking selected connections between reservations and hosts. The rules herein determine which connections are to be formed or broken. Each rule associates a connection-modification criterion with a condition. In the event, the condition for a rule is satisfied by a reallocation request (and its context), the criterion is applied to the request plus its context to generate a list of connection modification plans. Each connection-modification plan identifies one or more connections between hosts and reservations to be formed or broken. Implementing the plan yields the desired re-allocation. In the event, the request satisfies the conditions for more than one rule, there will be more than one connection-modification list. In that case, the plan to be modified can be selected from the intersection of the lists, i.e., the selected plan is one that can be found in each list generated by an applicable rule.

Herein, resource-allocation rules provide for automated re-allocations of host resources to reservations without the need for administrator intervention. Each resource-allocation rule includes a condition and an associated connection modification plan. For example, a rule can have the condition "if utilization of a reservation's sole host exceeds 80%" and a connection-modification plan "then add a connection between the reservation and an additional host". Implementing such a connection-modification plan, e.g., adding or deleting a connection between a reservation and a host, can effect a resource allocation for the reservation. Other examples are presented further below after a description of an applicable hosted computer system.

Figure 1:
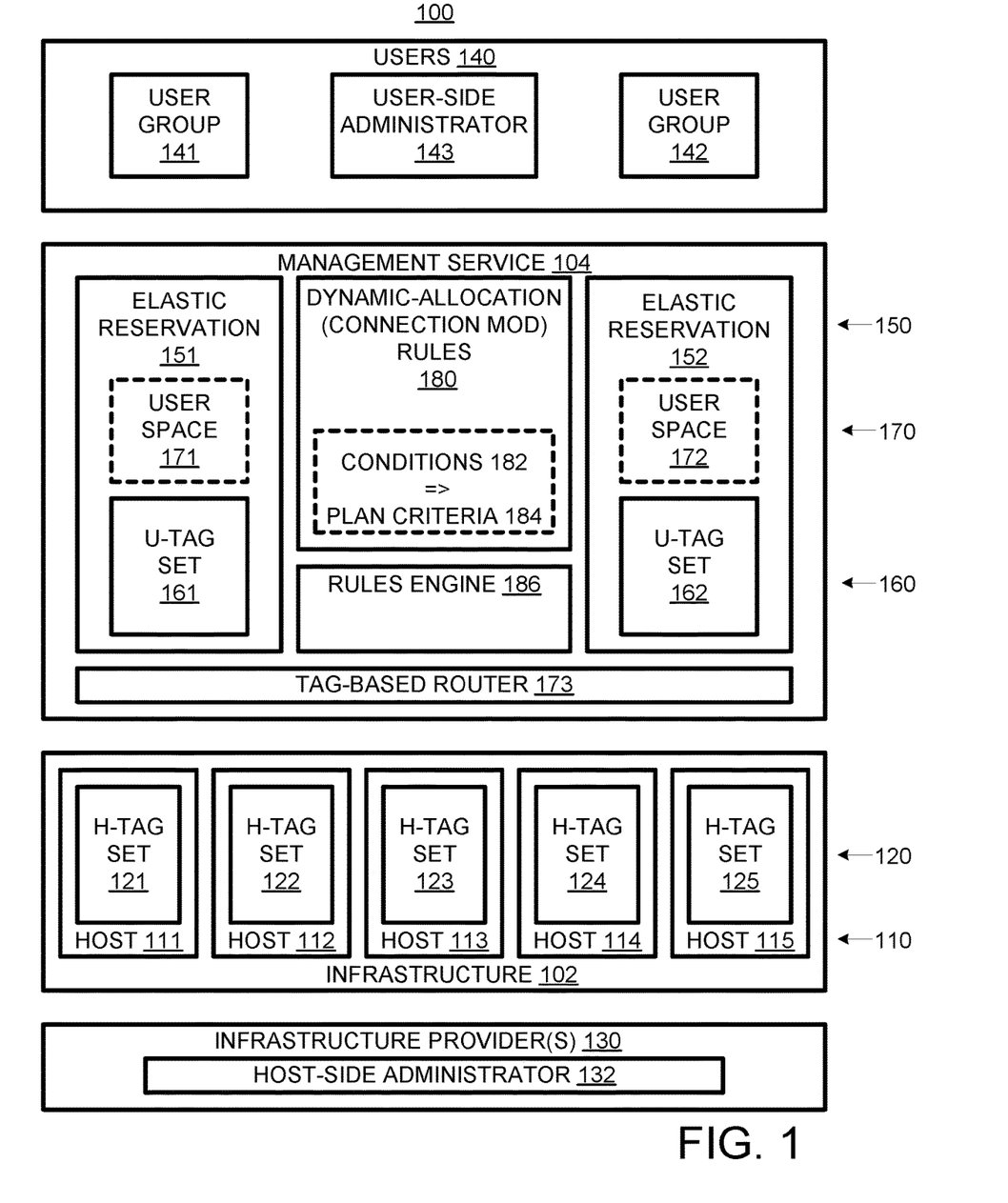
FIG. 1 is a computer system providing for rule-based reallocation of hosted compute resources.

As shown in FIG. 1, a hosting computer system 100 includes an infrastructure 102 and a management service 104. Infrastructure 102 includes plural hosts 110, including hosts 111, 112, 113, 114, and 115. In some scenarios, the hosts can be provided by one or more cloud providers and/or an on-premises computer system. Typically, each host 110 can be a hardware/software stack capped by a hypervisor that can support user virtual infrastructures, virtual machines and/or user process containers.

Associated with each host is a respective set 120 of host tags, which can include zero, one, or more "host" tags, aka, H-tags. For example, host-tag sets 121, 122, 123, 124, and 125 are associated respectively with hosts 111, 112, 113, 114, and 115. Infrastructure 102 can be provided by one or more infrastructure providers 130 and be managed by one or more host-side administrators 132.

Users 140 can include different groups, e.g., departments or projects, each of which can be assigned its own allocation of compute resources, e.g., hardware resources such as processing capacity, memory, storage capacity, and communications bandwidth, of infrastructure 102, software resources such as utilization monitors, and intangible resources such as software licenses. For example, users 140 include user group 141 and user group 142. In addition, users 140 can include a user-side administrator 143 (which is a role that can be served by one or more humans).

Conventionally, user groups are assigned to reservations of compute capacity with each reservation being directly assigned to a compute host. However, management service 104 employs "elastic" reservations 150, e.g., elastic reservations 151 and 152, for which the connections to hosts is subject to tag-based control. This allows reservations to be expanded, contracted, and otherwise modified using tags 160. To this end, each elastic reservation includes a respective user-tag set of zero, one, or more user tags, aka, U-tags. For example, user tag sets 161 and 162 are respectively associated with reservations 151 and 152. User spaces 170, including user spaces 171 and 172, serve as sites for storing a user-group's virtual entities such as virtual networks, virtual machines, and virtual storage.

A tag-based router 173 controls connections between elastic reservations and hosts according to respective tags. In other words, a connection is made based on matches between host tags 120 and user tags 160. For example, user-side administrator 143 can modify the resources available to a user group simply by modifying the user tag set of the corresponding elastic reservation. Alternatively, the resources available to a user group can be modified by adding, deleting, or replacing a host tag for a host.

These modifications to tags and, thus, connections, can be made automatically, that is, without administrator intervention, by applying dynamic-reservation rules 180. Each rule includes a condition 182 and a connection-modification plan criterion 184. A rules engine 186 detects satisfied conditions and, in response, generates connection-modification plans according to plan criteria 184. Rules engine 186 implements connection-modification plans including modifying a tag set of a reservation or a host to form or break a connection between a reservation and a host.

Figure 2:
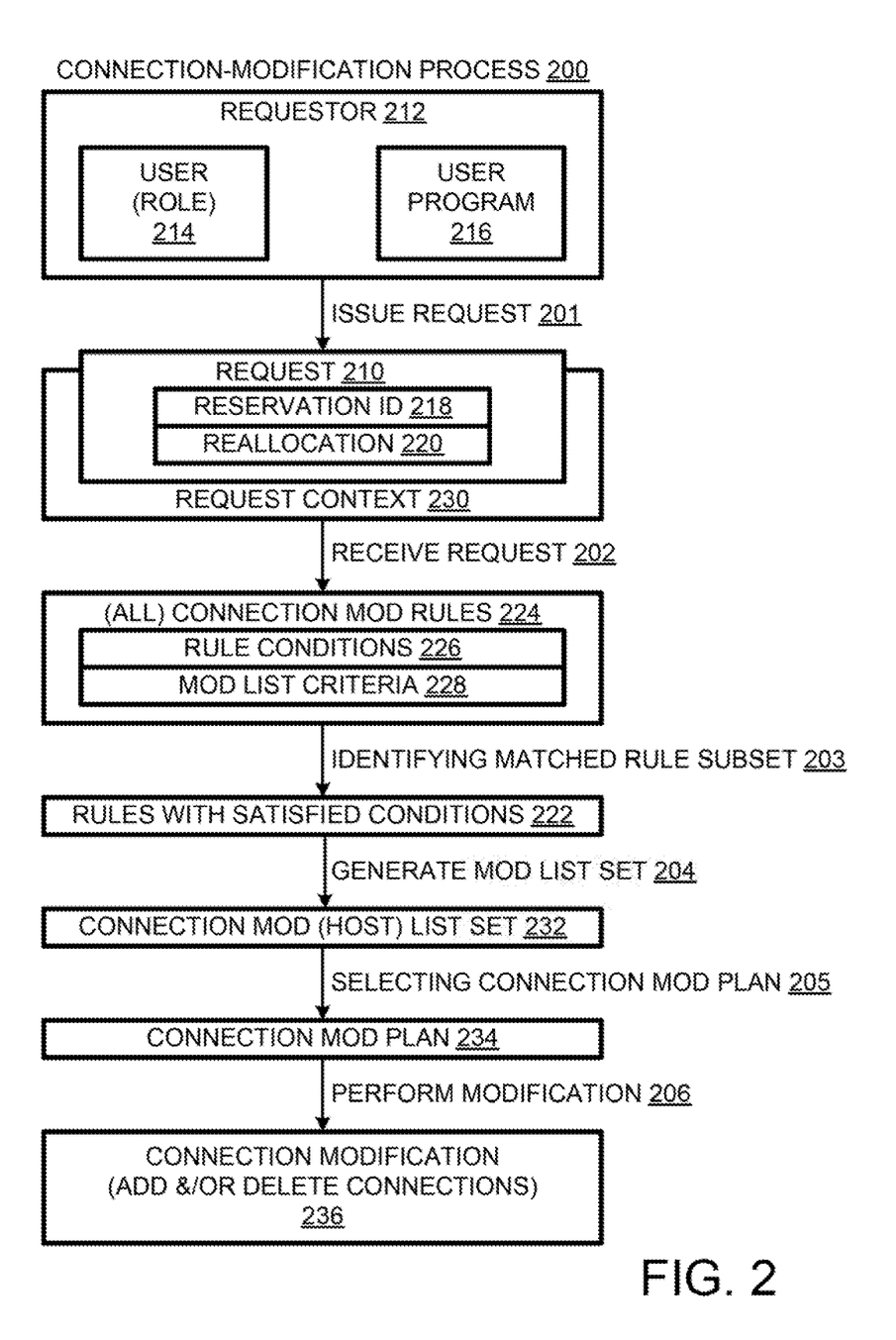
FIG. 2 is a flow chart of a rule-based re-allocation process implementable in the computer system of FIG. 1 and other systems.

A connection-modification process 200, shown in FIG. 2, can be implemented in computer system 100 and other systems. At 201 a re-allocation request 210 is issued. The request can be issued by a requestor 212, e.g., a user 214 or a user program 216. Each request 210 can specify one or more reservation identifiers 218 and a reallocation 220. Typically, the reservation identified is one associated with a user group to which the user belongs. In some cases, a different reservation or a set of two or more reservations may be specified. The reallocation can involve, for example, increasing (or decreasing) the amount of resources allocated to a respective reservation. The request may or may not specify a desired amount for the increase (or decrease). In some cases, a request may call for a transfer of an amount of resources from one reservation to another.

At 202, request 210 is received, e.g., by rules engine 186 (FIG. 1). At 203, a matched-rule subset 222 is identified. This is a subset of a set of connection-modification rules 224 to be applied to reallocation requests. Each rule includes a condition 226 and a modification list criterion 228. Each condition is evaluated given the current request and its context 230, e.g., time, resource utilization, requestor role, etc. Matched rule subset 222 includes those connection-modification rules 224 whose conditions are satisfied by the request and its context. In the event that the matched rule subset is empty, i.e., there were no matching rule conditions, then the request is forwarded to an administrator for handling.

At 204, a connection modification list set 232 is generated, e.g., by rules engine 186 (FIG. 1). A connection-modification list is generated for each matched rule 222. Each list is a list of connection-modification plans. List entries can specify connections to be formed, connections to be broken, or combinations of connection modifications. Note that, in the common case in which all connections are going to have the same reservation at one end, each connection can be defined by specifying the hypervisor-host at the other end of the connection. In such cases, the connection-modification list can be a list of hosts.

At 205, a connection-modification plan 234 is selected from those plans set forth in at least one connection-modification list. In the event there is one list and that one list has only one connection-modification plan, then that plan is selected. In the event there is one list with multiple plans, then the selection can be based on priority rules built into the corresponding rule or built into the rules engine. In the event there are multiple lists, the selection can be based on the contents of all lists considered collectively. In the illustrated embodiment, the selected connection-modification plan 234 is selected from the intersection of all lists. In other words, to be selected, plan 234 must be represented in each of the lists corresponding to the rules in the matched rule subset. In the event the intersection is empty, the action taken can be to forward the request to the administrator or take some other action (e.g., refusing the request) as specified by the rule or determined by the rules engine.

At 206, the modification 236 called for by the selected connection-modification plan is performed. In the illustrated embodiment, this performance involves adding and/or deleting tags from tag sets, the connection modifications being performed automatically once the tag-set changes are detected. In other embodiments, the connection modifications can be made without changing tag sets. Implementations of process 200 are presented with reference to FIGS. 3-6 below.

Figure 3:
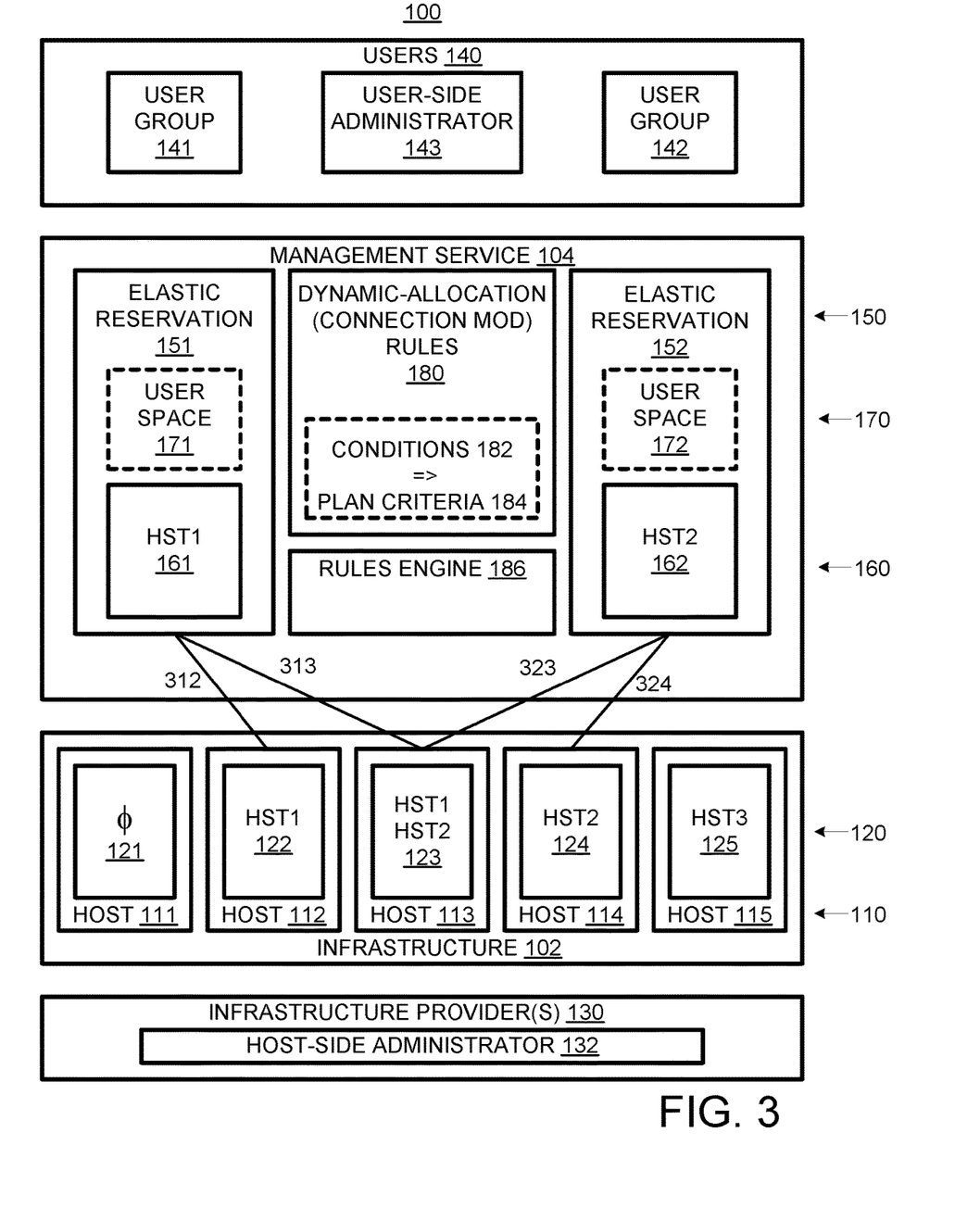
FIG. 3 is a pre-modification view of the computer system of FIG. 1.

Computer system 100 is shown in FIG. 3 at a time T1. User tag set 161 of elastic reservation 151 includes a user tag HST1; user tag set 162 of elastic reservation 152 includes a user tag HST2. Host tag set 121 is the null set, in other words, no tags have been assigned to host 111, e.g., because it has just been installed. Host tag sets 122, 124, and 125, respectively of hosts 112, 114, and 115 have host tags HST1, HST2, and HST3 respectively. Host tag set 123 of host 113 includes two tags, HST1 and HST2.

User tag HST1 of user tag set 161 of elastic reservation 151 matches host tag HST1 of host tag set 122 of host 112. Hence, a connection 312 is made between elastic reservation 151 and host 112. This connection indicates that user group 141 has access to resources of host 111 via elastic reservation 151. User tag HST2 of user tag set 162 of elastic reservation 152 matches host tag HST2 of host tag set 124 of host 114. Hence, a connection 324 is made between elastic reservation 152 and host 114. This connection 324 indicates that user group 142 has access to resources of host 114 via elastic reservation 152. Host tag set 123 of host 113 includes host tags HST1 and HST2, which match user tags in both elastic reservations 151 and 162. Hence connections 313 and 323 are formed, respectively, between host 113 and elastic reservation 151 and between host 113 and elastic reservation 152.

While computer system 100 is in the configuration of FIG. 3, user group 141 may request additional resources for elastic reservation 151. The request may be asserted by an authorized user, e.g., in anticipation of increased demand for applications running in user space 171, or the request may be asserted automatically, e.g., in response to a detection of a crossing of a utilization threshold.

Upon receipt of the request, rules engine 186 checks dynamic reservation rules 180. An applicable rule may be that, if the utilization of any of processing capacity or memory capacity exceeds 85% of maximum, then, the applicable reservation can be connected to an additional host (either by adding a tag to a host that matches a tag associated with the reservation or by adding a tag to the reservation that matches a tag to an unused host). In the present case, host 111 is unused and untagged. Accordingly, as indicated in FIG. 4, a connection modification plan 234 (FIG. 2) can be implemented by adding a tag HST1 to formerly empty tag set 121 so as to establish a new connection 411 to host HST1.

Alternatively, there may be two or more applicable rules. For example, a first connection-modification rule may have a modification list criterion that determines a first connection-modification host list including hosts 111 and host 114, while a second connection-modification rule may have a modification list criterion that determines a second connection modification (host) list including hosts 111 and 115. The only host in the intersection of would be host 111. Hence, connection 411 is the only available choice. Adding host tag HST1 to tag set 121 is one way to implement connection 411.

Figure 4:
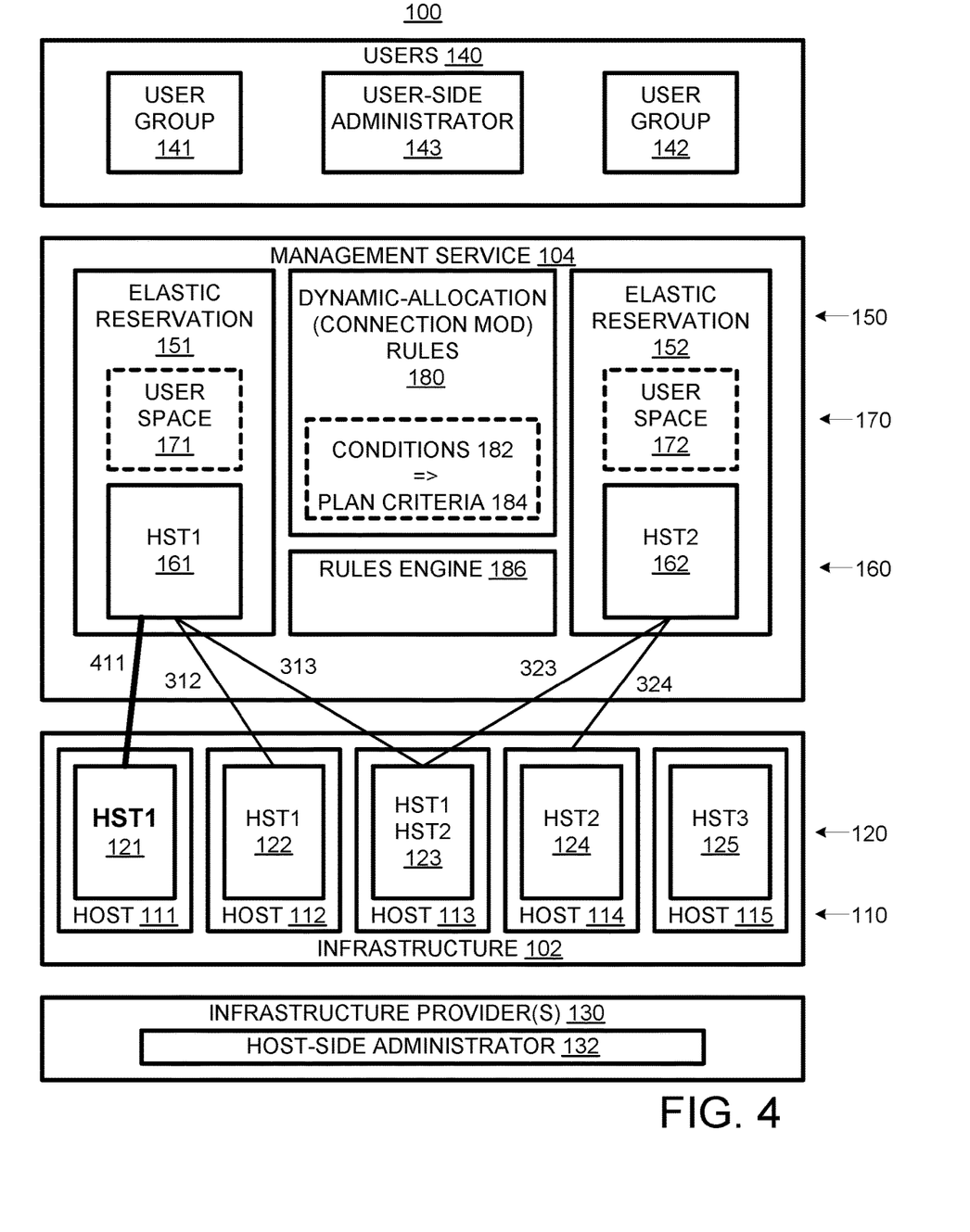
FIG. 4 is a post-modification view of the computer system of FIG. 3 in response to a first rule-based re-allocation.

Given the configuration of FIG. 4, user group 142 may issue a request for additional resources and, in this case, the same rule is applied, but this time for reservation 152. Instead of adding a new tag to a host, a new user tag HST3 is added to elastic reservation 152. This connects elastic reservation 152 to host 115, increasing the resources available to user group 142.

Figure 5:
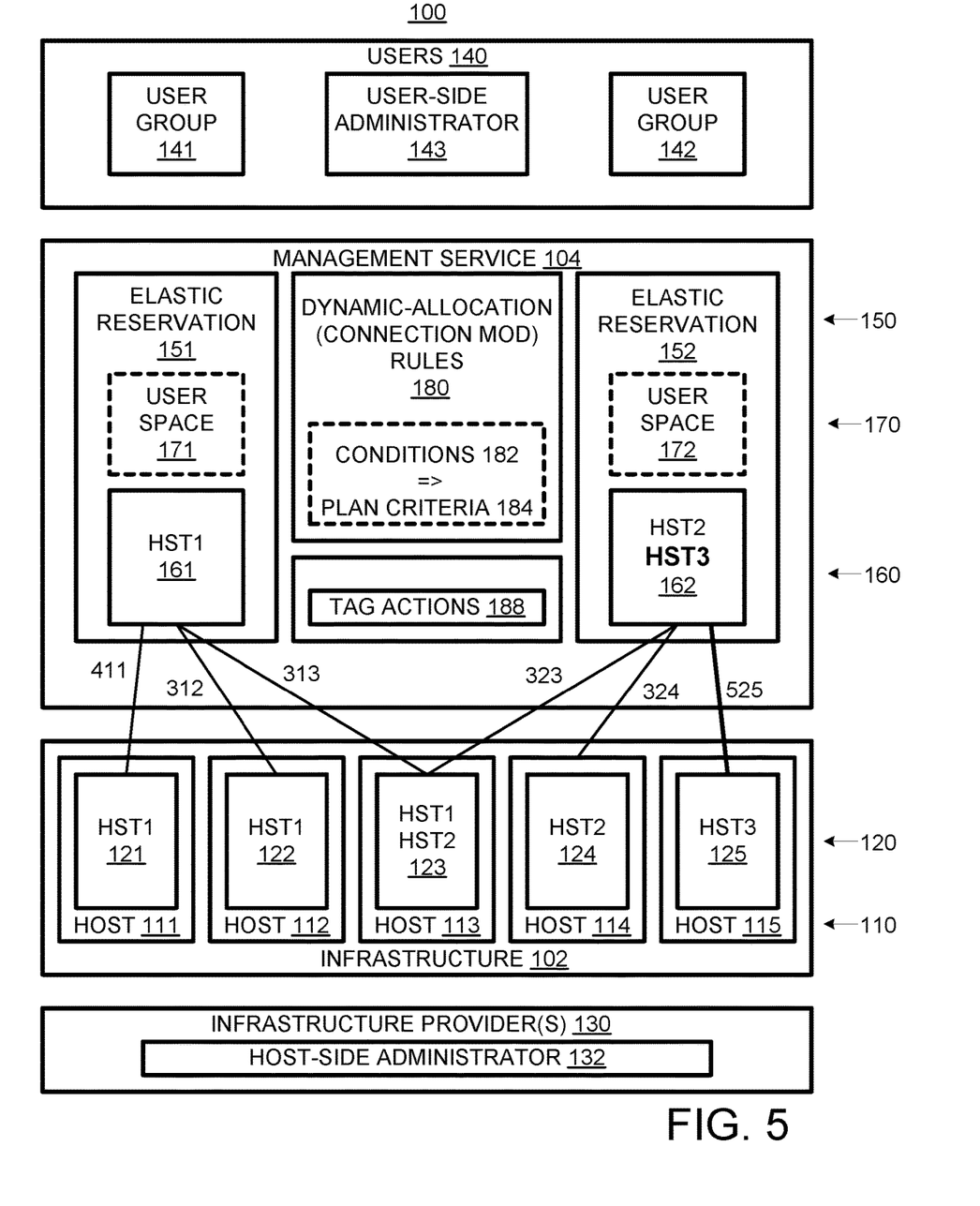
FIG. 5 is a post-modification view of the computer system of FIG. 4 in response to a second rule-based re-allocation.

Alternatively, the matched rule subset can include a pair of rules, one of which yields a connection-modification (host) list including hosts 111 and 115 and the other of which includes a connection-modification (host) list including hosts 112 and 115. The intersection of the lists is host 115. A connection 525 between the subject reservation 152 and the selected host 115 can be established by adding tag HST3 to host set 162.

Given the configuration of FIG. 5, user group 142 may request further increases in resources. An applicable rule can specify that if removing a connection will not increase utilization of the affected reservation over 70%, then the a request for an increase in resources for a subject reservation that is connected to a host can be met by breaking a connection between the host and the affected reservation.

Figure 6:
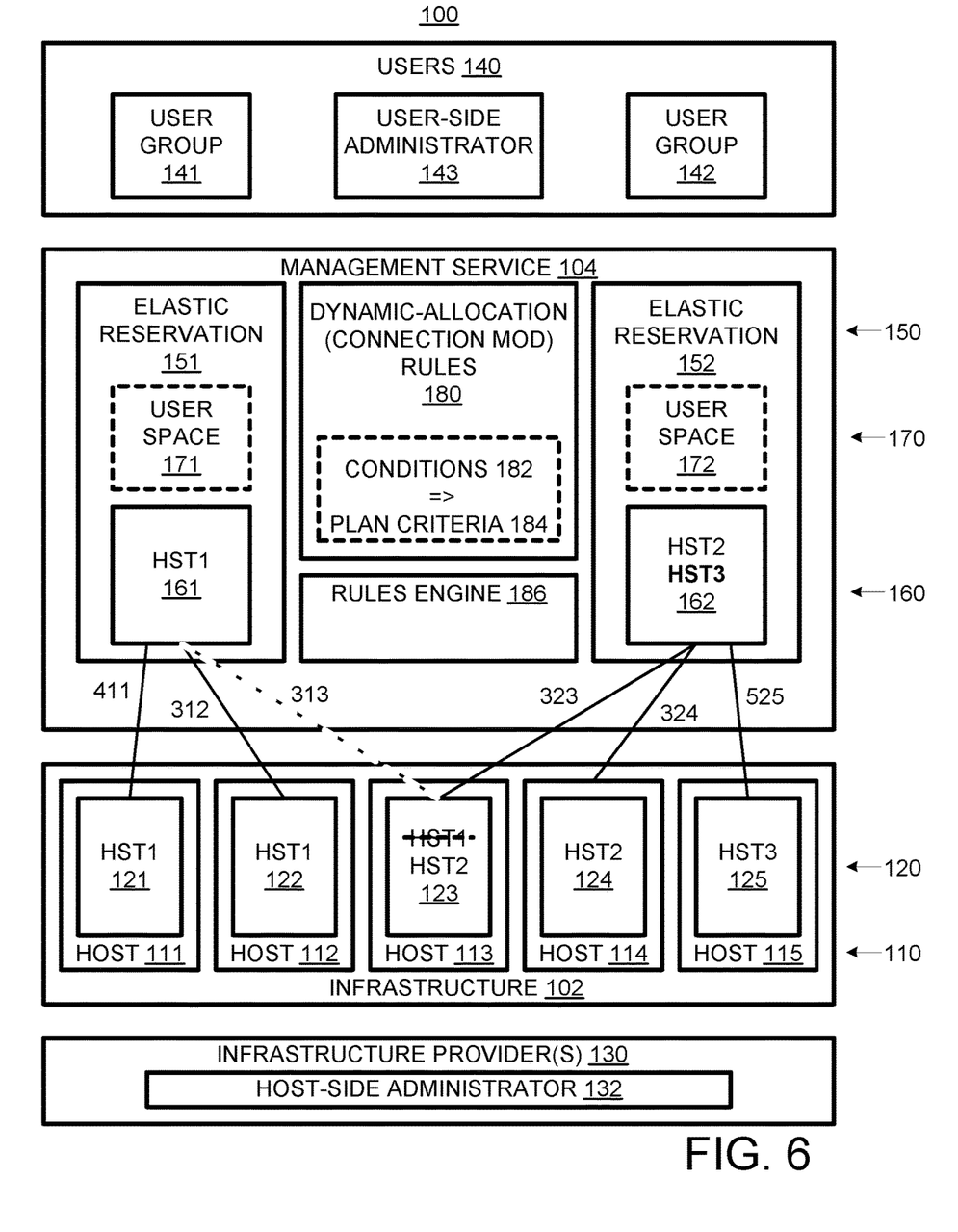
FIG. 6 is a post-modification view of the computer system of FIG. 5 in response to a third rule-based re-allocation.

In the example of FIG. 6, this condition is met and rules engine 186 modifies host tag set 123 by deleting tag HST1. This has the effect of breaking the connection between host 113 and elastic reservation 151; this in turn removes the competition for resources of host 113 and dedicates them entirely to elastic reservation 152.

The resource re-allocations indicated in FIGS. 4-6 can be performed without requiring the services of a user-side or a host-side administrator. If the request matches the condition of a resource re-allocation rule, the rule can be implemented to modify a tag set, which, in turn, can result in the forming or breaking a connection between a reservation and a host. This change in connections can result in a resource re-allocation.

Figure 7:
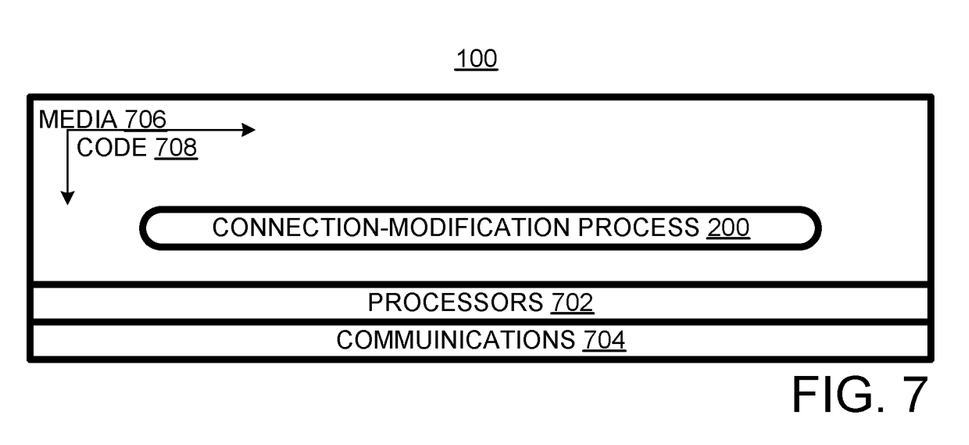
FIG. 7 is a system/media view of the computer system of FIG. 1.

Computer system 100 is presented alternatively in FIG. 7 including processors 702, communications devices 704 (including network and input/output devices), and non-transitory media 706 (including memory and mass storage). Code 708, encoded in media 706, provides for a rule-based connection modification process 210 (flow charted in FIG. 2).

Herein, a computer system is a combination of software programs and hardware for executing the software programs. The hardware includes at least one processor, media (e.g., memory and mass storage), and communications devices (e.g., network devices and input/output devices.) An "operating system" is software designed to control the hardware and serve as an interface for other programs to the hardware. A "hypervisor" is a virtualizing operating system, e.g., an operating system that provides for virtual machines (virtual computers), virtual operating systems (process containers), and virtual infrastructures (virtual networks including processing nodes and storage nodes). Herein, "virtual" denotes something that is not but appears to be; e.g., a virtual machine is not a machine, but appears to be a machine, e.g., a computer, to software running on the virtual machine.

Herein, a "host" is a computer system that provides an environment on which programs, including virtual entities, can run; the host provides resources that can be utilized by those programs. The hosts herein are typically hypervisor stacks, that is a virtualizing operating system and the hardware on which it runs. Herein, a "reservation" is a computer environment for user programs that, at any given time, provides for real or virtual compute resources to those user programs, where the resources can be real or virtual processors, memory, storage, communications bandwidth, etc. Herein, a reservation can be connected to one or more hosts that provide resources to the reservation.

Herein, a "tag" is a label that can be assigned to an entity, e.g., a host or a reservation. Unlike an identifier, which uniquely identifies an entity, a tag can be applied to multiple entities to indicate relations between entities or membership to a common class. Herein, in the event that a host and a reservation share a tag, they are connected or soon will be. Thus, by adding or deleting tags, the connections between hosts can reservations can be formed and broken. The result is that resources allocated to a reservation can be changed dynamically by changing the tags assigned to respective hosts and or reservations.

Herein, all art labelled "prior art", if any, is admitted prior art; all art not labelled "prior art", if any, is not admitted prior art. The illustrated embodiments, along with variations thereupon and modification thereto are provided for by the present invention, the scope of which is defined by the following claims.

What is claimed is:

1. A process comprising:
receiving a request for an update to a resource allocation for a first reservation in a computer system in which reservations provide users access to resources of hypervisor-hosts to which the reservations are respectively connected via respective reservation-host connections;
identifying a first matched rule from a set of rules, said first matched rule having a corresponding condition and a modification-list criterion, said first matched rule having conditions that are satisfied by a combination of said request and a context of said request;
identifying a second matched rule from said set of rules, said second matched rule having a corresponding condition and a modification-list criterion, said second matched rule having conditions that are satisfied by a combination of said request and a context of said request;
generating a modification-list set of lists of connection-modification plans, wherein each list in the modification-list set contains multiple connection-modification plans, each connection-modification plan indicating one or more reservation-host connections that are to be formed or broken, each list being generated according to the criterion of a respective matched rule;
selecting a connection-modification plan from an intersection of all the lists from the modification-list set of lists; and
performing a connection modification specified by the selected connection-modification plan.

2. The process of claim 1 wherein at least one of the rules of the first and second matched rules includes a first condition that is at least in part a function of utilization by the first reservation.

3. The process of claim 1 wherein at least one of the rules of the first and second matched rules includes a first condition that is at least in part a function of utilization by a reservation that is separate from a first entity and a second entity.

4. The process of claim 1 wherein the performing includes modifying a first tag set of the first reservation or of a first hypervisor host so as to make or break a tag match between the first reservation and the first hypervisor host.

5. The process of claim 4 wherein the modification includes adding a first tag to the first tag set, the first tag matching a second tag of a second tag set so that the modification results in making of a new connection between the first reservation and the first hypervisor host, the second tag set being associated with the first hypervisor host.

6. The process of claim 4 wherein the modification includes deleting a first tag from the first tag set, the first tag matching a second tag of a second tag set so that the modification results in breaking a connection between the first reservation and the first hypervisor host.

7. A system comprising non-transitory media encoded with code that, when executed by a processor, implements a process including:
receiving a request for an update to a resource allocation for a first reservation in a computer system in which reservations provide users access to resources of hypervisor-hosts to which the reservations are respectively connected via respective reservation-host connections;
identifying a first matched rule from a set of rules, said first matched rule having a corresponding condition and a modification-list criterion, said first matched rule having conditions that are satisfied by a combination of said request and a context of said request;

identifying a second matched rule from said set of rules, said second matched rule having a corresponding condition and a modification-list criterion, said second matched rule having conditions that are satisfied by a combination of said request and a context of said request;

generating a modification-list set of lists of connection-modification plans, wherein each list in the modification-list set of lists contains multiple connection-modification plans, each connection-modification plan indicating one or more reservation-host connections that are to be formed or broken, each list being generated according to the criterion of a respective matched rule;

selecting a connection-modification plan from an intersection of ail the lists from the modification-list set of lists; and performing a connection modification specified by the selected connection-modification plan.

8. The system of claim 7 wherein at least one of the rules of the first and second matched rules includes a first condition that is at least in part a function of utilization by the first reservation.

9. The system of claim 7 wherein at least one of the rules of the first and second matched rules includes a first condition that is at least in part a function of utilization by a reservation that is separate from a first entity and a second entity.

10. The system of claim 7 wherein the performing includes modifying a first tag set of the first reservation or of the first hypervisor host so as to make or break a tag match between the first reservation and a first hypervisor host.

11. The system of claim 10 wherein the modification includes adding a first tag to the first tag set, the first tag matching a second tag of a second tag set so that the modification results in making of a new connection between the first reservation and the first hypervisor host, the second tag set being associated with the first hypervisor host.

12. The system of claim 10 wherein the modification includes deleting a first tag from the first tag set, the first tag matching a second tag of a second tag set so that the modification results in breaking a connection between the first reservation and the first hypervisor host.

* * * * *